Oct. 22, 1968 G. O. HUNTZINGER 3,407,306
CRANKING MOTOR SOLENOID LOCKOUT CIRCUIT
Filed April 21, 1966
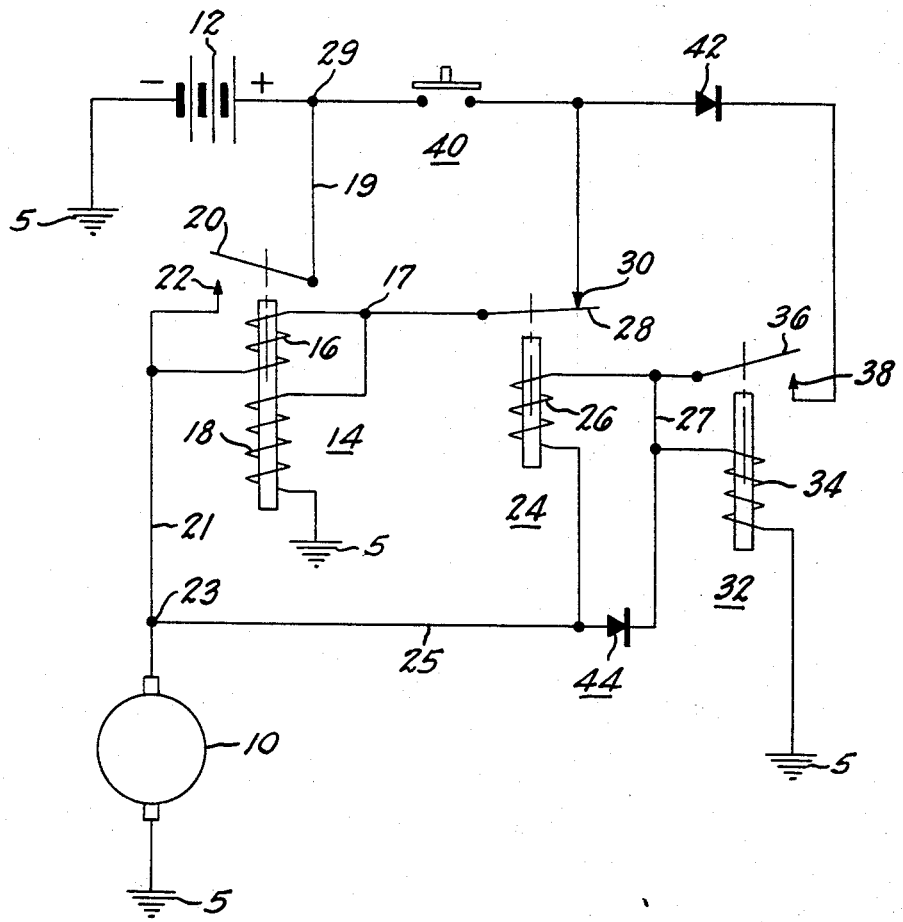
INVENTOR.
GERALD O. HUNTZINGER
BY
Richard G. Stahr
HIS ATTORNEY

United States Patent Office 3,407,306
Patented Oct. 22, 1968

3,407,306
CRANKING MOTOR SOLENOID LOCKOUT CIRCUIT
Gerald O. Huntzinger, Anderson, Ind., assignor to General Motors Corporation, Detroit, Mich., a corporation of Delaware
Filed Apr. 21, 1966, Ser. No. 544,255
3 Claims. (Cl. 290—38)

The present invention relates to an electric cranking motor solenoid lockout circuit and, more specifically, to a circuit which will automatically disenable an electric cranking motor solenoid energizing circuit in response to the opening of the solenoid contacts after an initial closure and while a direct curernt energizing potential is maintained thereacross.

Most electrical cranking motor solenoids have a pull-in coil which is connected in series with the cranking motor and a hold-in coil which is connetced in parallel with the series combination of the pull-in coil and cranking motor. Upon the closure of the contacts of a conventional "crank" switch, a direct current potential, usually supplied by a storage battery, is applied across this parallel combination. The current flowing through the pull-in coil and the hold-in coil operates the solenoid to close a pair of normally open contacts which connect the electric cranking motor directly across the storage battery. The closing of the solenoid contacts shorts out the pull-in coil but the current flow through the hold-in coil keeps the solenoid in its energized position until the "crank" switch is opened.

When the battery is low, the current drawn by the cranking motor may reduce battery potential to such a low value that the hold-in winding may be unable to maintain the solenoid contacts closed. As a result, the contacts open and battery potential again appears across the pull-in coil. The resulting current flow through the pull-in coil operates the solenoid to reclose the normally open contacts. This closing and opening of the solenoid contacts will continue to cycle as long as the "crank" switch is kept closed. This action, particularly with a 24-volt cranking motor system, may cause severe arcing which may damage or destroy the solenoid contacts.

Therefore, a cranking motor solenoid lockout circuit which will prevent this "pumping" of the cranking motor solenoid with low battery potentials is a highly desirable feature.

It is, therefore, an object of this invention to provide a cranking motor solenoid lockout circuit.

It is another object of this invention to provide a cranking motor solenoid lockout circuit which is responsive to the opening of the cranking motor solenoid contacts after an initial closure to disenable the energizing circuit for the cranking motor solenoid operating coils while a direct current energizing potential is maintained thereacross.

In accordance with this invention, a cranking motor solenoid lockout circuit is provided wherein the energizing circuit for the operating coils of an electric cranking motor solenoid operated switch is automatically interrupted by a switching arrangement which is responsive to the opening of the solenoid contacts after an initial closure while a direct current energizing potential is maintained across the operating coils.

For a better understanding of the present invention, together with additional objects, advantages and features thereof, reference is made to the following description and accompanying single figure drawing.

Referring to the drawing, the novel cranking motor solenoid lockout circuit in combination with an electric cranking motor 10 and a direct current potential source, which may be a conventional storage battery 12, is schematically set forth.

The cranking motor solenoid, generally shown at 14, includes a pull-in coil 16, a hold-in coil 18, a movable contact 20 and a stationary contact 22, which are normally open.

The novel cranking motor solenoid lockout circuit of this invention includes two switching devices. One of these switching devices is included in the energizing circuit for pull-in coil 16 and hold-in coil 18 of cranking motor solenoid 14 and the second switching device is responsive to the closing of contacts 20 and 22 of cranking motor solenoid 14 to condition the first switch to operate to interrupt the energizing circuit for pull-in coil 16 and hold-in coil 18 upon the opening of contacts 20 and 22 while the direct current potential from battery 12 is maintained thereacross. Without intention or inference of a limitation thereto, the switching devices included in this novel cranking motor solenoid lockout circuit have been shown to be electric relays, generally shown at 24 and 32. The specific connections and cooperative operation of these two switches will be explained in detail later in this specification.

Relay 24 includes an operating coil 26, a movable contact 28 and a stationary contact 30, which are normally closed, and relay 32 includes an operating coil 34, a movable contact 36 and a stationary contact 38, which are normally open.

Included in the energizing circuit for pull-in coil 16 and hold-in coil 18 of cranking motor solenoid 14 is a momentary contact switch 40, which may be the "crank" contacts of a conventional automotive type ignition switch which is well known in the art, and the normally closed contacts 28 and 30 of relay 24. Pull-in coil 16 is connected in series with cranking motor 10 and hold-in coil 18 is connected in parallel with this series combination between junction 17 and point of reference or ground potential 5 which, since it is the same point electrically, has been referenced by the same numeral throughout the drawing.

The energizing circuit for operating coil 26 of relay 24 includes switch 40, the normally open contacts 36 and 38 of relay 32 and cranking motor 10.

The initial energizing circuit for operating coil 34 of relay 32 includes the normally open contacts 20 and 22 of cranking motor solenoid 14 and diode 44.

Upon the closure of switch 40, pull-in coil 16 and hold-in coil 18 of cranking motor solenoid 14 are energized in parallel through the energizing circuit previously described. The energization of these pull-in and hold-in coils operates movable contact 20 to close to stationary contact 22 which establishes an energizing circuit for cranking motor 10 across battery 12 through line 19, now closed contacts 20 and 22 of cranking motor solenoid 14, line 21 and point of reference or ground potential 5.

The closure of contacts 20 and 22 of cranking motor solenoid 14 shorts out pull-in coil 16, therefore, cranking motor solenoid 14 must be maintained in the energized position by hold-in coil 18. With normal battery potentials, there is a sufficient flow of current through hold-in coil 18 to produce the required ampere-turns to maintain cranking motor solenoid 14 operated to close contacts 20 and 22 during the cranking operation. However, with low battery potential conditions, current flow through hold-in coil 18 may be of such a low value that sufficient ampere-turns are not produced thereby to maintain cranking motor solenoid 14 operated and contacts 20 and 22 will, therefore, open. Upon the opening of these contacts, battery potential is again applied across pull-in coil 16 and hold-in coil 18 and the resulting current flow therethrough again operates cranking motor solenoid 14 to close movable contact 20 to stationary contact 22 thereby energizing cranking motor 10 and shorting out pull-in winding 16. With low battery conditions, this "pumping" action will continue as long as switch 40 is closed. The novel cranking motor lockout circuit of this invention is incorporated to specifically prevent this "pumping" action.

When movable contact 20 of cranking motor solenoid 14 is closed to stationary contact 22 upon the closure of switch 40, full battery potential appears at junction 23 and operating coil 34 of relay 32 is energized by the current flowing from battery 12, through line 19, the closed contacts 20 and 22 of cranking motor solenoid 14, line 21, line 25 and diode 44 to point of reference or ground potential 5. With operating coil 34 of relay 32 energized, relay 32 is operated to close movable contact 36 to stationary contact 38.

The closing of movable contact 36 to stationary contact 38 of relay 32 establishes a self-locking energizing circuit for operating coil 34 which may be traced from the positive polarity terminal of battery 12, through switch 40, diode 42, closed contacts 36 and 38 and lead 27 to point of reference or ground potential 5. This energizing circuit for operating coil 34 of relay 32 will maintain relay 32 operated while switch 40 is maintained in the closed position regardless of whether or not contacts 20 and 22 of cranking motor solenoid 14 removes battery potential from junction 23. Relay 32 is designed to remain operated to close movable contact 36 to stationary contact 38 at a potential of a magnitude less than that at which contacts 20 and 22 of relay 14 will open.

The closing of contacts 36 and 38 of relay 32 also establishes an energizing circuit for operating coil 26 of relay 24, previously described. Operating coil 26 is connected across contacts 20 and 22 of cranking motor solenoid 14 between junctions 23 and 29 through switch 40, diode 42, contacts 36 and 38 of relay 32 and line 25. Upon the closure of contacts 20 and 22 of solenoid 14, a low resistance shunt circuit is established across the energizing circuit for operating coil 26 of relay 24 between junctions 29 and 23. Therefore, there is no potential applied across operating coil 26 and relay 24 is not operated at this time. The operation of relay 32 to close movable contact 36 to stationary contact 38 merely conditions relay 24 to operate should contacts 20 and 22 of the cranking motor solenoid 14 open while switch 40 is in the closed position.

If, for any reason, such as low battery potential, the contacts 20 and 22 of cranking motor 14 should open, the short circuit is removed from the energizing circuit for operating coil 26 of relay 24. Therefore, battery potential will be applied across operating coil 26 to operate relay 24 to open the normally closed contacts 28 and 30 which interrupts the energizing circuit for pull-in coil 16 and hold-in coil 18 of cranking motor solenoid 14. The interruption of the energizing circuit for pull-in coil 16 and hold-in coil 18 of cranking motor solenoid 14, upon the operation of relay 24 to open its normally open contacts 28 and 30, prevents further operation of cranking motor solenoid 14. The system will remain in this lockout condition so long as switch 40 is maintained in the closed position and will return to the normal condition of operation upon the opening of switch 40.

Diode 42 is included in the circuit to prevent the establishment of a holding energizing circuit for operating coil 18 of cranking motor solenoid 14, upon the closure of contacts 20 and 22 thereof and contacts 36 and 38 of relay 32, which would maintain operating coil 18 of solenoid 14 energized after switch 40 is released.

Diode 44 is inserted in this circuit to prevent the short circuiting of operating coil 26 of relay 24 by line 27.

In this specification electric relays have been set forth as the switching devices. It is to be specifically understood that other switching devices having similar electrical characteristics may be substituted therefor without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. A cranking motor solenoid lockout circuit comprising in combination with a cranking motor solenoid operated switch having a pull-in coil, a hold-in coil and two normally open contacts, a first switching device, a second switching device, electrical circuit means including said first and second switching devices for establishing an energizing circuit for said pull-in and hold-in coils and a third switching device responsive to the closing of said solenoid contacts for conditioning said second switching device to operate to interrupt said electrical circuit means upon the opening of said solenoid contacts after the initial closure while said first switch means is in the closed position.

2. The cranking motor solenoid lockout circuit as described in claim 1 wherein said second and third switching devices are electric relays.

3. A cranking motor solenoid lockout circuit comprising in combination with a direct current potential source, an electrical cranking motor and a cranking motor solenoid operated switch having a pull-in coil, a hold-in coil and two normally open contacts, first circuit means including said normally open contacts of said solenoid operated switch for connecting said cranking motor across said direct current potential source, an electrical switch, a first electric relay having an operating coil and two normally closed contacts, second electrical circuit means including said electrical switch and said normally closed contacts of said first relay for connecting said pull-in and hold-in coils of said solenoid operated switch across said direct current potential source, a second electric relay having an operating coil and two normally open contacts, third electrical circuit means including said normally open contacts of said second electric relay and said electrical switch for connecting said operating coil of said first relay across said normally open contacts of said solenoid operated switch and fourth electrical circuit means including said normally open contacts of said solenoid operated switch for connecting said operating coil of said second relay across said direct current potential source.

No references cited.

ORIS L. RADER, *Primary Examiner.*

G. SIMMONS, *Assistant Examiner.*